(12) United States Patent
Salit et al.

(10) Patent No.: US 9,772,187 B2
(45) Date of Patent: Sep. 26, 2017

(54) STIMULATED BRILLOUIN SCATTERING (SBS) GYRO WITH COUPLED RESONATOR FOR FREQUENCY-DEPENDENT OUTPUT COUPLING

(71) Applicant: Honeywell International Inc., Morris Plains, NJ (US)

(72) Inventors: Mary K. Salit, Plymouth, MN (US); Jianfeng Wu, Tucson, AZ (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 38 days.

(21) Appl. No.: 15/052,490

(22) Filed: Feb. 24, 2016

(65) Prior Publication Data

US 2017/0241784 A1    Aug. 24, 2017

(51) Int. Cl.
*G01C 19/66* (2006.01)
*H01S 3/067* (2006.01)
*H01S 3/108* (2006.01)

(52) U.S. Cl.
CPC ........ *G01C 19/661* (2013.01); *H01S 3/06791* (2013.01); *H01S 3/1086* (2013.01)

(58) Field of Classification Search
CPC .... G01C 19/66; G01C 19/661; G01C 19/667; G01C 19/72
See application file for complete search history.

(56) References Cited

U.S. PATENT DOCUMENTS

| | | |
|---|---|---|
| 4,159,178 A | 6/1979 | Vali et al. |
| 4,396,290 A | 8/1983 | Morris |
| 4,530,097 A * | 7/1985 | Stokes .................. G01C 19/66 356/461 |
| 4,863,272 A | 9/1989 | Coccoli |
| 5,064,288 A | 11/1991 | Dyes et al. |
| 5,323,415 A | 6/1994 | Quast et al. |
| 5,351,252 A | 9/1994 | Toyama et al. |

(Continued)

OTHER PUBLICATIONS

European Patent Office, "Office Action from EP Application No. 13191290.9 mailed Feb. 21, 2014", "from Foreign counterpart of U.S. Appl. No. 13/693,321", Feb. 21, 2014, pp. 1-6, Published in: EP.

(Continued)

*Primary Examiner* — Jonathan Hansen
(74) *Attorney, Agent, or Firm* — Fogg & Powers, LLC

(57) ABSTRACT

A ring laser gyroscope (RLG) is provided. The RLG includes a primary resonator, a secondary resonator, and an optical source to provide a pump field. The pump field in the primary resonator stimulates an optical gain curve at a first stokes wave frequency. A first order SBS field stimulates a second optical gain curve at a second stokes wave frequency. The second order SBS gain gives rise to a frequency-shifted field propagating in the first direction. The fraction of the pump field that couples out of the primary resonator, through the secondary resonator, and out of the secondary resonator is larger than the fraction of: the first order SBS field that couples out of the primary resonator, through the secondary resonator, and out of the secondary resonator; and a second order SBS field that couples out of the primary resonator, through the secondary resonator, and out of the secondary resonator.

20 Claims, 7 Drawing Sheets

(56) References Cited

U.S. PATENT DOCUMENTS

| | | | |
|---|---|---|---|
| 5,406,370 | A | 4/1995 | Huang et al. |
| 5,408,317 | A | 4/1995 | Dyes et al. |
| 5,517,305 | A | 5/1996 | Raab |
| 5,537,671 | A * | 7/1996 | Toyama ............ G01C 19/72 356/461 |
| 6,424,664 | B1 | 7/2002 | Oh et al. |
| 7,024,069 | B2 | 4/2006 | Savchenkov et al. |
| 7,065,276 | B2 | 6/2006 | Scheuer et al. |
| 7,184,624 | B1 | 2/2007 | Matsko et al. |
| 7,372,574 | B2 | 5/2008 | Sanders et al. |
| 7,463,360 | B2 | 12/2008 | Hughes et al. |
| 8,289,616 | B1 | 10/2012 | Maleki et al. |
| 8,659,760 | B2 | 2/2014 | Sanders et al. |
| 8,830,478 | B2 | 9/2014 | Wu et al. |
| 9,581,448 | B2 | 2/2017 | Christensen et al. |
| 2011/0255094 | A1 | 10/2011 | Mohageg et al. |
| 2012/0189025 | A1 | 7/2012 | Zheng et al. |
| 2014/0152994 | A1 | 6/2014 | Wu et al. |

OTHER PUBLICATIONS

Abd-Rahman et al., "Multiwavelength, bidirectional operation of twin-cavity Brillouin/erbium fiber laser", "Optics communications 181", Jul. 1, 2000, pp. 135-139, Publisher: Elsevier Science B.V.

Chen, Shiyi, "Stimulated Brillouin Scattering in an On-Chip Microdisk Resonator—Abstract", Dec. 2014, Publisher: University of Illinois at Urbana-Champaign.

Hitz, "Silicon Raman Laser Cascades Toward Mid-IR Spectral Region", "Nature Photonics", Mar. 2008, pp. 170-174.

Kim et al., "Non-reciprocal Brillouin Scattering Induced Transparency", "Nature Physics", Jan. 26, 2015, pp. 275-280, vol. 11.

Li et al., "Microresonator Brillouin Gyroscope", "Optical Society of America", 2015, pp. 1-2.

Viatsko et al., "Optical resonators with whispering gallery modes I: Basics", "IEEE JSTQE", Jan.-Feb. 2006, pp. 3-14, vol. 12, No. 1.

Pant et al., "On-Chip Stimulated Brillouin Scattering", "Optics Express", Apr. 25, 2011, pp. 8285-8290, vol. 19, No. 9.

Pant et al., "On-chip Stimulated Brillouin Scattering for Microwave Signal Processing and Generation", "Laser & Photonics Reviews", 2014, pp. 653-666, vol. 8, No. 5.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Takesue et al, "An On-Chip Coupled Resonator Optical Waveguide Single-Photon Buffer", "Nature communications", Nov. 12, 2013, pp. 1-11.

Wu et al., "Systems and Methods for an Optical Frequency Comb Stimulated Brillouin Scattering Gyroscope With Rigid Optical Waveguide Resonator", "U.S. Appl. No. 14/680,331, filed Apr. 7, 2015", Apr. 7, 2015.

Salit et al., "Single-Pump Cascaded Stimulated Beillouin Scattering (SBS) Ring Laser Gyro", "U.S. Appl. No. 14/882,101, filed Oct. 13, 2015", Oct. 13, 2015, pp. 1-37, Publisher:, Published in: US.

Yariv, "Critical Coupling and Its Control in Optical Waveguide-Ring Resonator Systems", "IEEE Photonics Technology Letters, Apr. 2002",, pp. 483-485, vol. 14, No. 4.

Zarinetchi et al., "Stimulated Brillouin fiber-optic laser gyroscope", "Optics Letters", Feb. 15, 1991, pp. 229-231, vol. 16, No. 4, Publisher: Optical Society of America, Published in: New York, NY.

European Patent Office, "Extended Search Report for EP Application No. 16187068.8 mailed Jan. 23, 2017", "From Foreign Counterpart to U.S. Appl. No. 14/882,101", filed Jan. 23, 2017, pp. 1-8, Published in: US.

Nicati et al., "Frequency Stability of a Brillouin Fiber Ring Laser", "Journal of Lightwave Technology", Jul. 1, 1995, pp. 1445-1451, vol. 13, No. 7, Published in: US.

United States Patent and Trademark Office, "Notice of Allowance", "From U.S. Appl. No. 14/882,101", dated Apr. 11, 2017, pp. 1-31, Published in: US.

* cited by examiner

STIMULATED BRILLOUIN SCATTERING (SBS) GYRO WITH COUPLED RESONATOR FOR FREQUENCY-DEPENDENT OUTPUT COUPLING

BACKGROUND

There is a need for low cost, high performance gyroscopes for navigation systems, precision point systems, and guidance systems. The navigation-grade gyro market has historically favored HeNe ring laser gyroscopes (RLGs) such as the GG1320, but thermally extreme, high shock, and high vibration applications in GPS-denied missions require a new look at the trade space. In conventional RLGs, a "dither motor" is required to prevent resonance frequencies from becoming degenerate at small rates; and the dither motor requires fragile moving parts, which are unsuitable for high shock and vibration applications. The monolithic integration of optical waveguides on a single silicon substrate with no moving parts offers an advantage in demanding environments.

Prior art Stimulated Brillouin Scattering (SBS) gyroscopes have high pump power requirements due to the inefficiency with which the pump laser light is converted to light at the Brillouin-shifted sensing frequency. Some prior art SBS gyroscopes require two pump lasers to generate two counter propagating SBS and do not fully benefit from the low relative phase noise between pump and SBS.

SUMMARY

The present application relates to a ring laser gyroscope. The ring laser gyroscope includes a primary-optical-ring resonator, an optical source to provide a pump field at a pump frequency that is on resonance with the primary-optical-ring resonator, and a secondary-optical-ring resonator. The primary-optical-ring resonator is configured to guide optical fields in a first direction and a second direction, the second direction being opposite the first direction. The primary-optical-ring resonator includes at least one optical coupling region to couple optical fields into and out of the primary-optical-ring resonator. The secondary-optical-ring resonator includes at least two optical coupling regions, one of which couples optical fields into and out of the primary-optical-ring resonator, and one of which couples the pump field into and out of the secondary-optical-ring resonator. The pump field couples into the primary-optical-ring resonator from the secondary-optical-ring resonator. The pump field in the primary-optical-ring resonator stimulates a first optical gain curve at a first stokes wave frequency downshifted by a Brillouin stokes frequency from the pump frequency. The primary-optical-ring resonator has a resonator mode within a bandwidth of the first optical gain curve. The SBS gain gives rise to a frequency-shifted field propagating in the second direction. A first order SBS field stimulates a second optical gain curve at a second stokes wave frequency downshifted by twice the Brillouin Stokes frequency from the pump frequency. The primary-optical-ring resonator has a resonator mode within the bandwidth of the second optical gain curve. The second order SBS gain gives rise to a frequency-shifted field propagating in the first direction. The fraction of the pump field that couples out of the primary-optical-ring resonator, through the secondary-optical-ring resonator, and out of the secondary-optical-ring resonator is larger than: 1) the fraction of the first order SBS field that couples out of the primary-optical-ring resonator, through the secondary-optical-ring resonator, and out of the secondary-optical-ring resonator; and 2) the fraction of a second order SBS field that couples out of the primary-optical-ring resonator, through the secondary-optical-ring resonator, and out of the secondary-optical-ring resonator.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
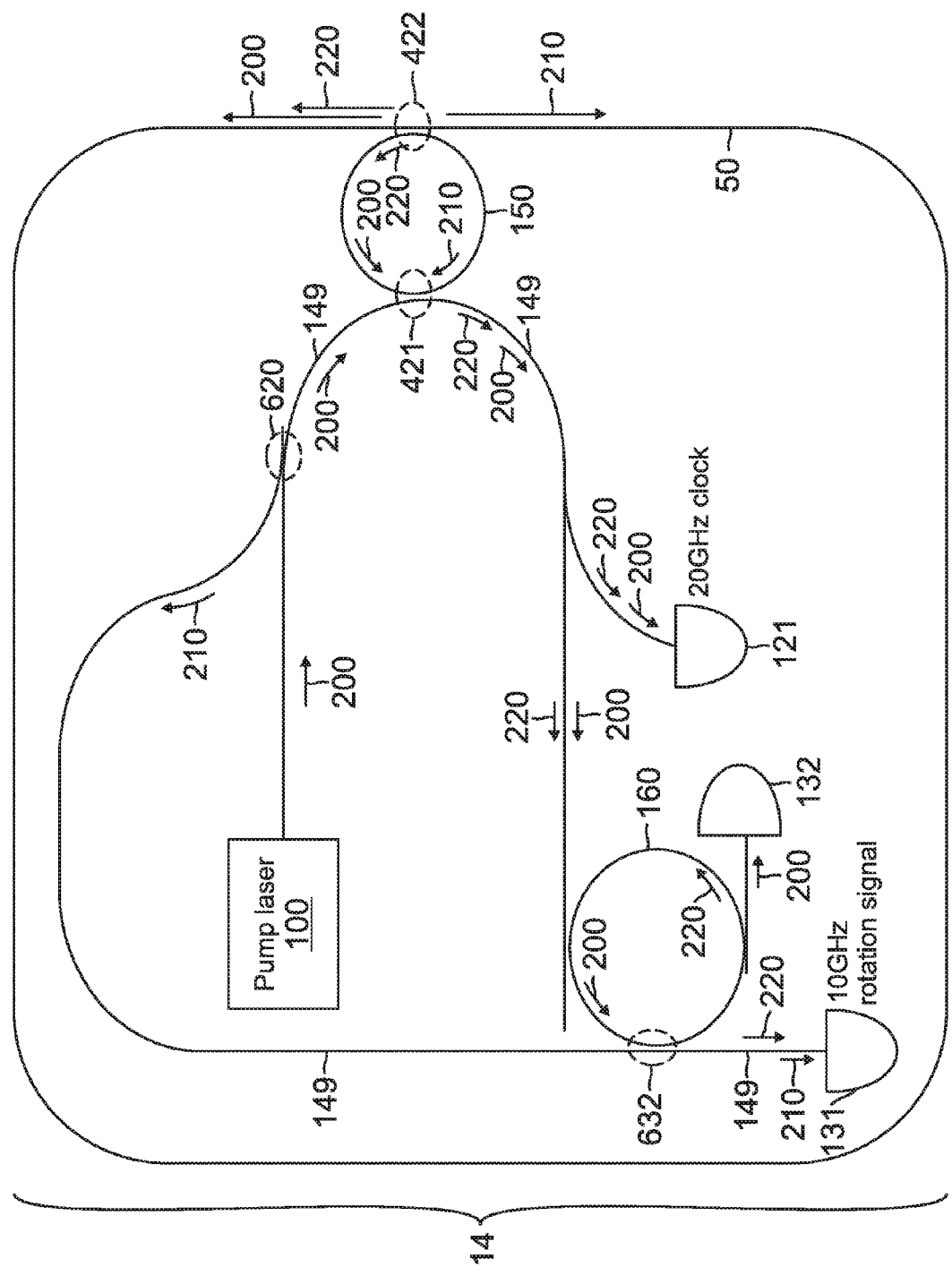
FIG. 1 shows an embodiment of a ring laser gyroscope in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The systems and methods described herein take advantage of the properties of stimulated Brillouin scattering (SBS) by generating second order stimulated Brillouin scattered light from first order stimulated Brillouin scattered light to create, from a single pump laser, two optical fields propagating in opposite directions at different known frequencies. The pump light is coupled into a primary-optical-ring resonator via a frequency dependent secondary-optical-ring resonator. The primary-optical-ring resonator 50 is a gyroscope resonator cavity for a ring laser gyroscope. The first order stimulated Brillouin scattered light and the second order stimulated Brillouin scattered light generated in the primary-optical-ring resonator are coupled out of the primary-optical-ring resonator via the secondary-optical-ring resonator.

FIG. 1 shows an embodiment of a ring laser gyroscope in accordance with the present application. The ring-laser-gyroscope 14 includes an optical source 100, a primary-optical-ring resonator 50, a secondary-optical-ring resonator 150, an optical clock detector 121, a beat detector 131, a pump rejection filter 160, and a pump absorber 132. The optical source 100 provides an optical pump field 200 at a pump frequency $v_p$ that is on resonance with the primary-optical-ring resonator 50. The optical source 100 is also referred to herein as "pump laser 100". The optical pump field 200 refers to the electro-magnetic fields of the light generated by the pump laser 100. The primary-optical-ring resonator 50 is also referred to herein as a "main resonator 50" or "primary resonator 50". The secondary-optical-ring resonator 150 is also referred to herein as a "coupling-resonator 150" or "secondary resonator 150" and functions as frequency dependent optical coupler for the primary-optical-ring resonator 50. The pump rejection filter 160 is also referred to herein as an optical filter 160.

Figure 2B:
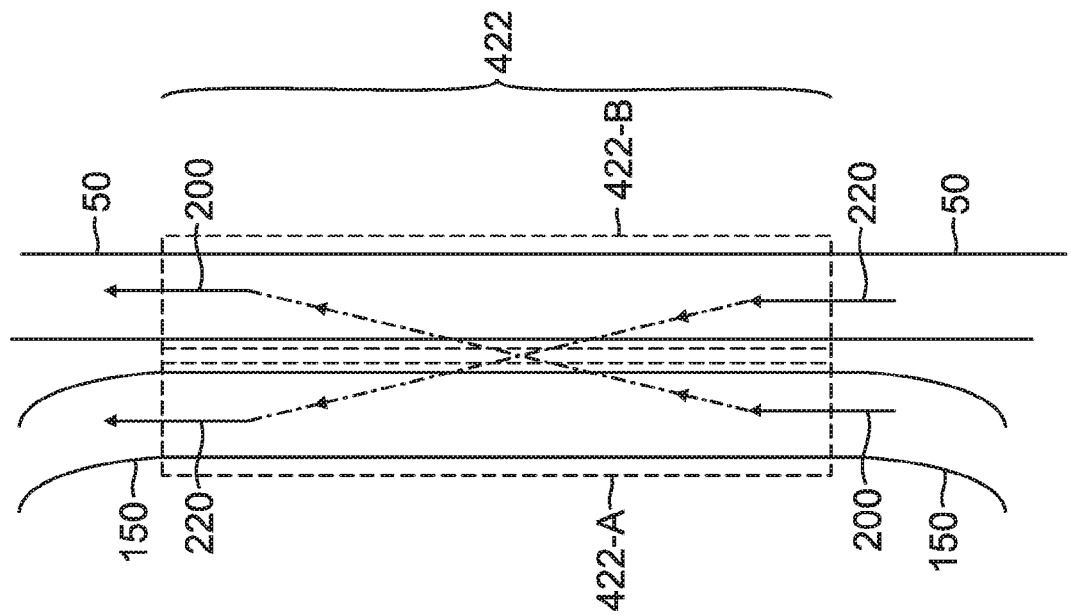
FIGS. 2A and 2B show enlarged views of embodiments of optical couplers including optical coupling regions of optical waveguides that are optically coupled.
Figure 2A:
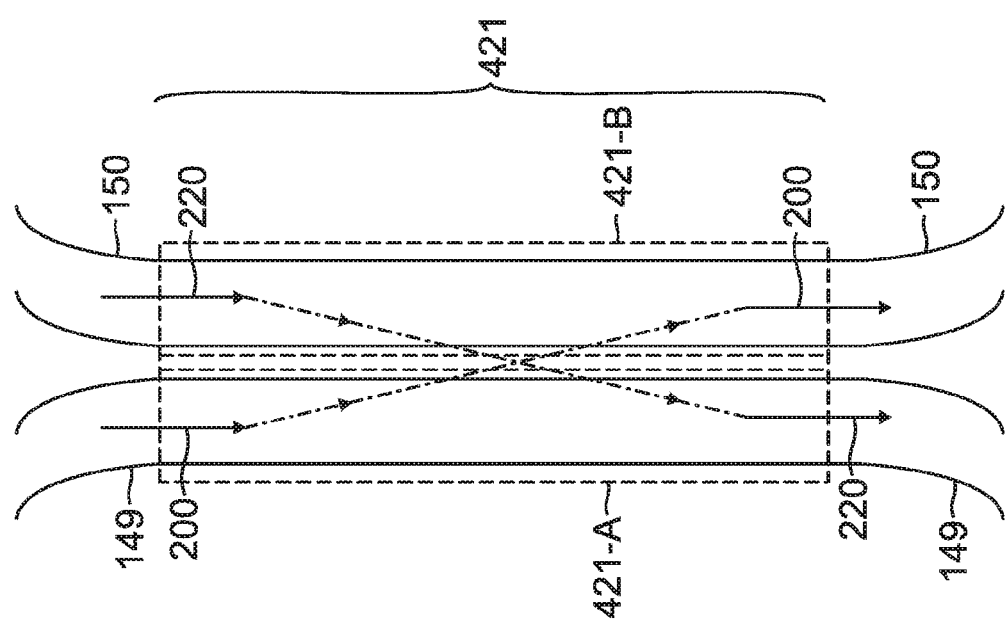

FIGS. 2A and 2B show enlarged views of embodiments of optical couplers 421 and 422 including optical coupling regions of optical waveguides that are optically coupled to each other. FIG. 2A shows an enlarged view of the optical coupler 421 including optical coupling regions represented generally by dashed boxes as 421-A and 421-B of respective optical waveguides 149 and 150 that are optically coupled to each other. FIG. 2B shows an enlarged view of the optical coupler 422 including optical coupling regions represented generally by dashed boxes as 422-A and 422-B of optical waveguides 150 and 50 that are optically coupled to each other.

The primary-optical-ring resonator 50 (FIG. 1) is a waveguide 50 configured to guide optical fields in a first direction and a second direction. The primary-optical-ring resonator 50 includes at least one optical coupling region 422-B in the directional coupler 422 to couple optical fields into and out of the primary-optical-ring resonator 50 as shown in FIG. 2B. The secondary-optical-ring resonator 150 is a waveguide 150 configured to guide optical fields in a first direction and a second direction. The secondary-optical-ring resonator 150 includes at least two optical coupling regions 421-B and 422-A in respective optical couplers 421 and 422 as shown in FIGS. 2A and 2B. The optical coupling region 422-A (FIG. 2B) couples optical fields into and out of the primary-optical-ring resonator 50. The optical coupling region 421-B (FIG. 2A) couples the pump field 200 into and out of the secondary-optical-ring resonator 150.

The pump field 200 couples into the primary-optical-ring resonator 50 from the secondary-optical-ring resonator 150 and out of the primary-optical-ring resonator 50 into the secondary-optical-ring resonator 150 via the optical coupler 422. A first order SBS field 210 and a second order SBS field 220 are stimulated within primary-optical-ring resonator 50 as described below. The fraction of the pump field 200 that couples out of the primary-optical-ring resonator 50, through the secondary-optical-ring resonator 150, and out of the secondary-optical-ring resonator is larger than: 1) the fraction of the first order SBS field 210 that couples out of the primary-optical-ring resonator 50, through the secondary-optical-ring resonator 150, and out of the secondary-optical-ring resonator 150; and 2) the fraction of a second order SBS field 220 that couples out of the primary-optical-ring resonator 50, through the secondary-optical-ring resonator 150, and out of the secondary-optical-ring resonator 150.

As shown in FIG. 1, the optical pump field 200 is emitted from an optical source 100 (pump laser 100) and couples into the secondary-optical-ring resonator 150 via the optical coupler 421. As shown in FIG. 2A, at least a portion of the optical pump field 200 propagating in waveguide 149 is coupled from the optical coupling region 421-A to the optical coupling region 421-B and ends up propagating in the secondary-optical-ring resonator 150 in the first direction. In this manner, the optical pump field 200 is coupled to propagate in a first direction in the secondary-optical-ring resonator 150. The optical pump field 200 is coupled from the secondary-optical-ring resonator 150 into the primary-optical-ring resonator 50 via optical coupler 422 to propagate in the primary-optical-ring resonator 50 in the first direction. As shown in FIG. 2B, at least a portion of the optical pump field 200 propagating in the secondary-optical-ring resonator 150 in the first direction is coupled from the optical coupling region 422-A to the optical coupling region 422-B and ends up propagating in the primary-optical-ring resonator 50 in the first direction. In this manner, the optical pump field 200 is coupled to propagate in in a first direction in the primary-optical-ring resonator 50.

As shown in FIG. 2B, at least a portion of the second order SBS field 220 propagating in waveguide 50 (i.e., the primary-optical-ring resonator 50) in the first direction is coupled from the optical coupling region 422-B to the optical coupling region 422-A and ends up propagating in the primary-optical-ring resonator 50 in the first direction. As is shown in FIG. 2A, at least a portion of the second order SBS field 220 propagating in waveguide 150 (i.e., the secondary-optical-ring resonator 150) in the first direction is coupled from the optical coupling region 421-B to the optical coupling region 421-A and ends up propagating in the optical waveguide 149. A portion of the optical pump field 200, which is also propagating in primary-optical-ring resonator 50 in the first direction, is also coupled from the optical coupling region 422-B to the optical coupling region 422-A and ends up propagating in the secondary-optical-ring resonator 150. For clarity of viewing that is not shown in FIG. 2B. Likewise, the portion of the optical pump field 200, which is also propagating in secondary-optical-ring resonator 150 in the first direction, is also coupled from the optical coupling region 421-B to the optical coupling region 421-A and ends up propagating in the optical waveguide 149. For clarity of viewing that is not shown in FIG. 2A.

In general, an optical coupler (e.g., optical coupler 421 or 422) diverts some fraction of the light guided into the optical coupler onto another path, while allowing the remainder to continue propagating in the original direction. Typically, in a waveguide coupler as shown in FIGS. 2A and 2B, the coupling ratio is defined to be the fraction of light which is diverted as compared with the incident light. For example, if 10% of the light guided into the optical coupler is diverted onto the other waveguide, the optical coupler has a coupling ratio of 0.10.

One skilled in the art understands how to design and fabricate these types of optical couplers 421 and 422. Other types of optical couplers 421 and 422 in a primary-optical-ring resonator 50 and the secondary-optical-ring resonator 150, including future developed optical couplers, can be used in the systems described herein.

Figure 3:
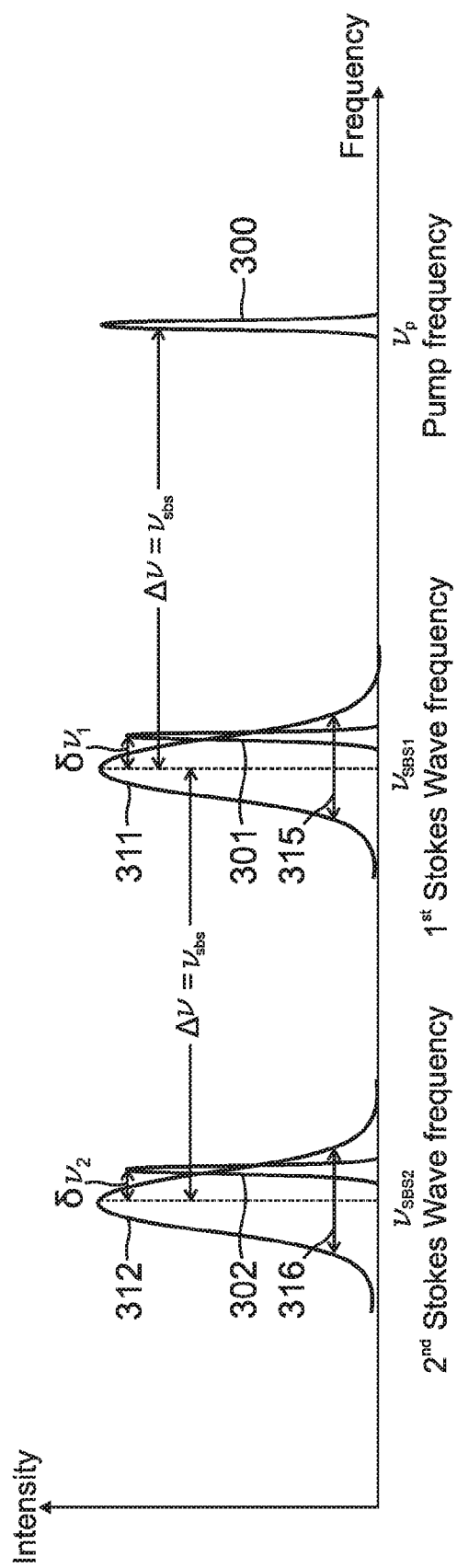
FIG. 3 shows the frequency distribution of an optical pump field, a first order stimulated Brillouin scattering (SBS) field, and a second order SBS field in accordance with the present application.

FIG. 3 shows the frequency distribution of an optical pump field, a first order SBS field, and a second order SBS field in accordance with the present application. The optical pump field 200 is at a pump frequency $v_p$ and propagates in a first direction. The first order SBS field is at a first Stokes wave frequency $v_{SBS1}$ and propagates in a second direction opposite the first direction of propagation of the pump field 200. The second order SBS field is at a second Stokes wave frequency $v_{SBS2}$ and co-propagates with the optical pump field 200 in the first direction. In this exemplary case, the first direction is the counter-clockwise (CCW) direction and the second direction is the clockwise (CW) direction. The primary-optical-ring resonators 50 in the embodiments of ring laser gyroscopes described herein resonate at the pump frequency $v_p$, the first Stokes wave frequency $V_{SBS1}$, and the second Stokes wave frequency $V_{SBS2}$.

As the optical pump field 200 propagates through the primary-optical-ring resonator 50 (FIG. 1), a first optical gain curve 311 (FIG. 3) is stimulated by the optical pump field 200 at a first Stokes wave frequency $v_{SBS1}$ that is downshifted by a Brillouin Stokes frequency $v_{sbs}$ from the pump frequency $v_p$. As shown in FIG. 3, the primary-optical-ring resonator 50 has a resonator mode 301 within the bandwidth 315 of the first optical gain curve 311. With sufficiently low resonator loss, the optical gain in the first optical gain curve 311 gives rise to a lasing electro-magnetic field, which counter propagates with the optical pump field 200. First order stimulated Brillouin scattering provides the optical gain, and amplifies the electro-magnetic fields, which counter-propagate with the optical pump field 200.

In this manner, when the optical pump field 200 exceeds a stimulated Brillouin scattering threshold, the optical pump field 200 has sufficient optical power to stimulate the first order SBS field 210 (FIG. 1) at the frequency $V_{SBS1}$ (FIG. 3), which is within the first SBS gain bandwidth that is downshifted from the pump frequency $v_p$ by the Brillouin Stokes frequency $v_{sbs}$. The frequency between pump laser and first order SBS ($v_p$-$v_{SBS1}$) is designed to be approximately an integer multiple (e.g., integer is N) of the Free Spectral Range (FSR) (N×FSR) of the primary-optical-ring resonator. The intensity of the first order SBS field 210 increases as the intensity of the optical pump field 200 increases. The first order SBS field 210 propagates in a second direction that is opposite to the first direction of propagation of the optical pump field 200.

In turn, as the first order SBS field 210 propagates in the second direction through the primary-optical-ring resonator 50, a second Brillouin scattering gain curve 312 is stimulated by the first order SBS field 210 at a second Stokes wave frequency $V_{SBS2}$ that is downshifted by the Brillouin Stokes frequency $v_{sbs}$ from the first SBS field at $V_{SBS1}$. As shown in FIG. 3, the primary-optical-ring resonator 50 has a resonator mode 302 within the bandwidth 316 of the second optical gain curve 312. With sufficiently low resonator loss, the optical gain in the first optical gain curve 311 gives rise to a lasing electro-magnetic field counter propagating to the first order SBS field 210. Second order stimulated Brillouin scattering provides the optical gain, and amplifies electro-magnetic fields, which counter-propagate with the first order SBS field 210.

In this manner, when the intensity of the first order SBS field 210 exceeds the stimulated Brillouin threshold, the first order SBS field 210 has sufficient optical power to stimulate the second order SBS field 220 at frequency $V_{SBS2}$, which is approximately at one of the resonator resonances within the second order SBS gain bandwidth. The frequency $V_{SBS2}$ of second order SBS field 220 is roughly N×FSR away from the frequency $v_{SBS1}$ of the first SBS field, and about 2N×FSR away from pump frequency $v_p$ of pump field 200. The intensity of the second order SBS field 220 increases as the intensity of the first order SBS field 210 increases. As shown in FIG. 1, the second order SBS field 220 propagates in the first direction that is opposite the second direction of propagation of the first order SBS field 210. Thus, the second order SBS field 220 co-propagates with the optical pump field 200.

The frequency difference between the first order SBS field 210 and the second order SBS field 220 is a frequency shift that is a function of the properties of the primary-optical-ring resonator 50 (i.e., index of refraction, core size and numerical aperture, etc.) and frequency shift caused by rotation rate ($f_\Omega$). The frequency difference is equal to N×FSR, plus a small index-dependent offset of the resonance frequency, and does not match the center of the gain profile, plus rotation frequency shift. This frequency difference is measured as a beat frequency that is used to determine a rotation rate of the primary-optical-ring resonator 50. In one implementation of this embodiment, the $V_{SBS1}$ is downshifted approximately 11 GHz from the pump frequency $v_p$. In this case, the first order SBS field 210 is downshifted ~11 GHz from the pump frequency $v_p$ and counter propagating with the optical pump field 200 and the second order SBS field 220 is downshifted ~22 GHz from the pump frequency $v_p$ and co-propagating with the optical pump field 200.

It is known to one skilled in the art that the pump power 200 is coupled into the gyro resonator most efficiently if the coupling coefficient matches the round trip optical loss in the primary-optical-ring resonator 50. When 100% of the light is coupled from an input waveguide into an optical-ring resonator then the optical-ring resonator and input waveguide are critically coupled to each other. An analysis of coupling between waveguides and/or ring resonators is described by Amnon Yariv in *Critical Coupling and Its Control in Optical Waveguide-Ring Resonator System*, IEEE Photonics Technology Letters, Vol. 14, No. 4, April 2002.

Since the SBS process causes relatively high optical losses for the pump fields in the primary-optical-ring resonator 50, a relatively large coupling coefficient for the pump fields is required. But in order for the SBS fields to lase and in order to minimize Angle Random Walk (ARW) sources related to resonator finesse within the primary-optical-ring resonator 50, the lasing fields (i.e., the first order SBS 210 and the second order SBS 220 generated in the primary-optical-ring resonator 50) must see a very small coupling coefficient. The frequency dependent secondary-optical-ring resonator 150 described herein is designed so: 1) the primary-optical-ring resonator 50 is high finesse for the lasing fields; and 2) the primary-optical-ring resonator 50 is a lower finesse for the pump. The secondary-optical-ring resonator 150 serves as a frequency dependent coupler designed so the coupling coefficient for the pump field 200 into the primary-optical-ring resonator 50 (i.e., the gyro resonator 50) through the secondary-optical-ring resonator 150 is higher than the coupling coefficient for the lasing SBS fields out of the primary-optical-ring resonator 50 through the secondary-optical-ring resonator 150. In this manner, the optical power requirements of the gyro are reduced by 10× or more than a SBS gyro system with a directional coupler in place of the secondary-optical-ring resonator. The secondary-optical-ring resonator 150 is designed, in other words, to transmit more pump light than SBS laser light through it, and thus the secondary-optical-ring resonator couples more pump than SBS light into and out of the primary resonator 50.

In one implementation of this embodiment, the pump field is somewhat off resonance with the coupling-resonator 150. If the coupling-resonator 150 were 100% transparent to the pump field 150, the pump frequency $v_p$ would not resonate in the main resonator 50 since the pump field would couple out of the main resonator 50 after a single round trip. Partial transparency the pump field at the pump frequency $v_p$ is obtained by setting the pump frequency $v_p$ somewhat near resonance with the secondary-optical-ring resonator 150. In this case, the pump field is critically coupled to the main resonator 50. As described above, critical coupling requires the coupling matches the losses in the cavity. Most of the pump field loss is due to stimulation of the SBS process. SBS is more efficient at higher pump powers. So the level of the loss depends on the pump power. In order to keep the pump field (in the coupling-resonator 150) critically coupled to the main resonator 50, the coupling coefficient needs to increase as the pump power increases. This can be achieved by tuning the coupling resonator closer to or further from resonance with the pump.

In another implementation of this embodiment, the pump frequency $v_p$ is on resonance (or close to resonance) with the secondary-optical-ring resonator 150, and the optical pump field 200 is not critically coupled to the secondary-optical-ring resonator 150. This embodiment is requires careful design and proper selection of the coupling ratios for each of the directional couplers 421 and 422 coupling optical power into and out of the secondary-optical-ring resonator 150 and the primary-optical-ring resonator 50.

One skilled in art, upon reading and understanding this document, understands these design tradeoffs and can design a system to ensure that the first order SBS field 210 and the second order SBS field 220 are generated and are output from the primary-optical-ring resonator 50 and the secondary-optical-ring resonator 150 in order for the system to detect the rotation rate of the gyroscope.

The optical pump field 200, which co-propagates in the primary-optical-ring resonator 50 with the $2^{nd}$ order SBS lasing mode (i.e., second order SBS field 220), differs from it in frequency by $v_p$-$v_{SBS2}$ (on the order of 20 GHz). The exact value of the difference in frequency is a function of the properties of the waveguides that from the primary-optical-ring resonator 50. This frequency difference does not depend on rotation rate since the electro-magnetic fields co-propagate. The frequency difference is approximately a multiple of the number of the FSRs (2N×FSR) between second order SBS and pump. This beat signal is used as the reference signal, which is also referred to herein as clock signal or a reference/clock signal. The self-generation of the clock signal at optical clock detector 121 (FIG. 1) cancels out bias errors due to free spectral range (FSR) drift in the primary-optical-ring resonator 50 caused by, for example, temperature changes. FSR drift is indistinguishable from rotation on the Brillouin Stokes frequency $v_{sbs}$ (e.g., ~10 GHz) beat note, but is canceled out on the gyro output due to the correlated effect on the doubled Brillouin Stokes frequency $2*v_{sbs}$ (e.g., ~20 GHz) clock signal.

As shown in FIG. 1, the first order SBS field 210 and the second order SBS field 220 are guided as co-propagating optical fields in a section of the waveguide 149 between the optical coupler 632 and the beat detector 131 to be incident on the beat detector 131. The co-propagating first order SBS field 210 and second order SBS field 220 that are incident on the beat detector 131 have beat frequency at the difference between the first frequency ($v_{SBS1}$) of the first order SBS field 210 and the second frequency ($v_{sbs2}$) of the second order SBS field 220. The beat detector 131 produces an optical beat signal that varies as a function of a frequency difference between the first order SBS field 210 and the second order SBS field 220. The generated beat signal between the first order SBS field 210 and the second order SBS field 220 is approximately equal to an integer multiple of the FSRs plus the rotation-induced frequency shift (N×FSR+$f_\Omega$) and is used to determine a rate of rotation based on the beat signal within the gyroscope.

Under rotation, the Sagnac effect causes the resonator cavity of the primary-optical-ring resonator 50 to appear longer for one propagation direction and compressed for the other propagation direction, resulting in a differential shift ($f_\Omega$) in the lasing frequencies, from which rotation rate can be ascertained. A high degree of common mode rejection of noise processes is obtained by using two adjacent SBS orders to sense rotation. The two adjacent SBS orders to sense rotation can be the first and second orders of SBS, as described herein, the second and third order of SBS, the third and fourth order of SBS, and so forth.

Since almost all noise sources are common between these two resonant lasing modes, the dominant noise source on this beat frequency measurement is quantum noise. Thus, the Angle Random Walk (ARW) depends on the output power of each lasing mode.

In one implementation of this embodiment, the primary-optical-ring resonator 50 and the secondary-optical-ring resonator 150 are rigid optical waveguides that are also referred to herein rigid-primary-optical-ring resonator 50 and rigid-secondary-optical-ring resonator 150. The rigid optical waveguide resonator 50 can be formed in a semiconductor material, in deposited or thermally grown films such as silicon dioxide and silicon nitride, in glass, or in plastic. The rigid optical waveguide resonator 50 can be formed by etching the waveguide into a substrate, or into one or more layers deposited on the substrate, or using other techniques such as modifying the index of a glass using a laser. As known to one skilled in the art, the etching of a substrate or film may be followed by deposition of one or more layers of material and one or more additional etching processes to ensure the waveguide is a low loss waveguide.

In one implementation of this embodiment, the optical fields in the RLG 14 (FIG. 1) that propagate external to the primary-optical-ring resonator 50 and the secondary-optical-ring resonator 150 are guided through rigid optical waveguides 149. In another implementation of this embodiment, the optical fields in the RLG 14 (FIG. 1) that propagate external to the primary-optical-ring resonator 50 and the secondary-optical-ring resonator 150 are guided through other types of optical waveguides 149, such as optical fibers. In this latter embodiment, the optical fibers are spliced/coupled together using known techniques with the appropriate coupling coefficients. In yet another implementation of this embodiment, the optical fields in the RLG 14 external to the primary-optical-ring resonator 50 and the secondary-optical-ring resonator 150 propagate through air by various field guiding components such as optical field splitter and mirrors as known to one skilled in the art. Other techniques for guiding and directing light are possible.

Figure 4:
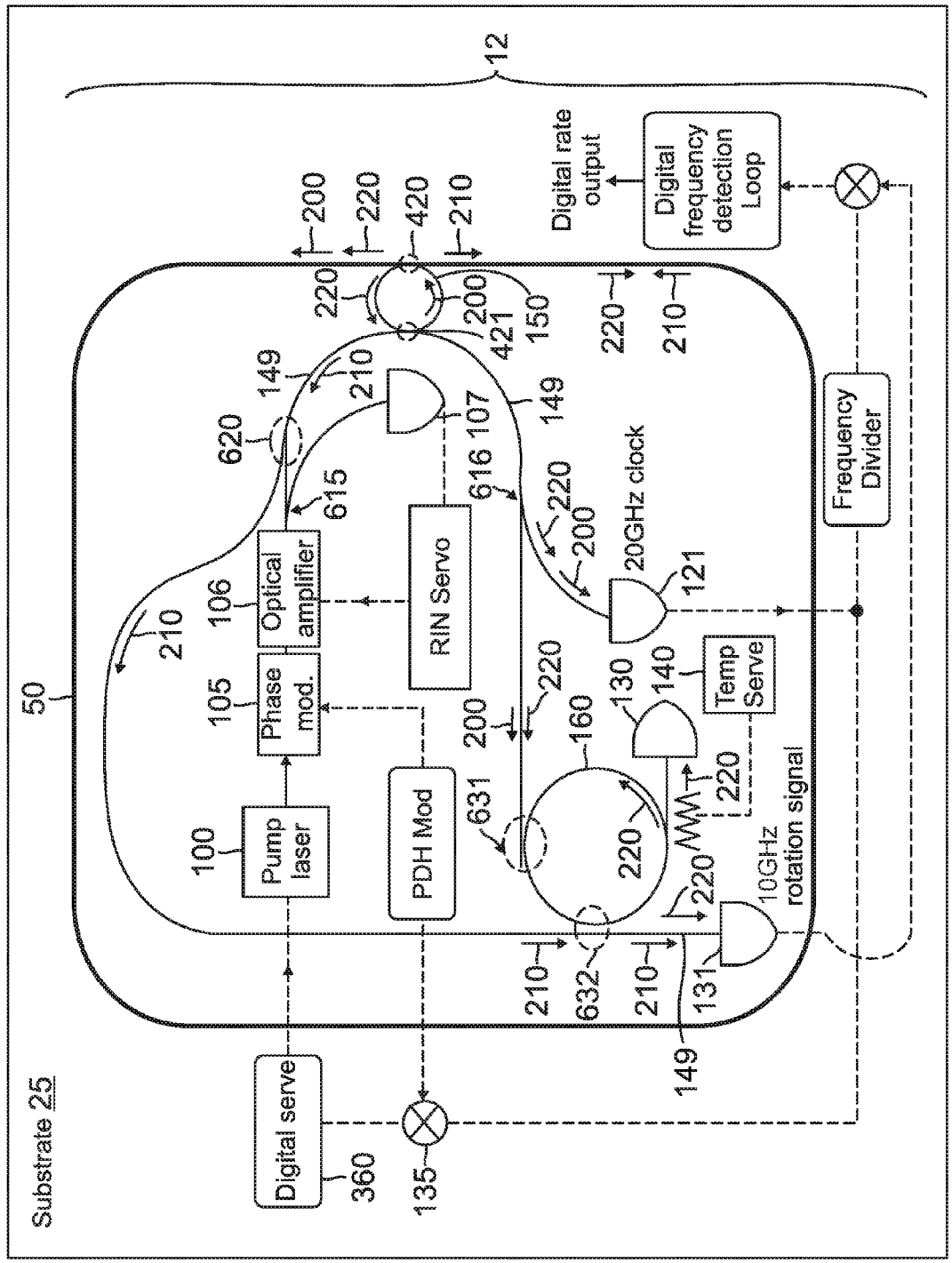
FIG. 4 shows an embodiment of a ring laser gyroscope on a substrate in accordance with the present application.

FIG. 4 shows an embodiment of a RLG 12 on a substrate 25 in accordance with the present application. The RLG 12 includes the components shown in the RLG 14 of FIG. 1 and also includes an electro-optical modulator 105, an optical amplifier 106, a relative intensity noise (RIN) monitor 107, and Pound-Hall-Drever (PDH) loop electronics. The phase modulator 105 modulates the optical pump field 200 emitted from the continuous wave pump laser 100 and the optical amplifier 106 amplifies the output from the phase modulator 105. A portion of the modulated, amplified optical pump field 200 is tapped off from the waveguide by a Y-splitter 615 to the RIN monitor 107 as part of a feedback loop with a RIN servo to the optical amplifier 106.

The Pound-Hall-Drever (PDH) loop electronics include a PDH mixer 135 and a PDH servo 360 (digital servo 360). The beat detector 131 outputs a rotation signal to the frequency detection loop that outputs a digital rate signal. The optical clock detector 121 outputs a clock signal to the PDH mixer 135 and to the frequency detection loop via a frequency divider and a mixer to mix with the rotation signal from the beat detector 131.

The primary-optical-ring resonator 50 and the secondary-optical-ring resonator 150 are etched in the substrate 25 to minimize round-trip resonator loss, including excess loss at the optical couplers 421 and 422. The substrate 25 is also referred to herein as a "rigid resonator chip 25". In one implementation of this embodiment, one or more of the components of the RLG 12 is formed within the interior area of substrate 25. In one implementation of this embodiment, the laser 100 is formed on the rigid resonator chip 25 on which the primary-optical-ring resonator 50 and the secondary-optical-ring resonator 150 are formed, and the primary-optical-ring resonator 50 wraps around the laser 100 and the secondary-optical-ring resonator 150. Currently used and future developed hybrid integration processing techniques allow for co-location of lasers, detectors, optical filters (e.g., optical filter 160), and any required modulators (e.g., phase modulator 105) or optical amplifiers 106 on the same chip. In one implementation of this embodiment, the dimensions (e.g., length and width) of rigid resonator chip 25 are on the order of inches. In one implementation of this embodiment, the RLG 12 is not on a substrate but rather the components of the RLG 12 are positioned on a carrier, such as a printed circuit board.

As shown in FIG. 4, the untapped optical pump field 200 propagates through a circulator represented generally at 620 and is coupled into the secondary-optical-ring resonator 150 via the optical coupler 421 (FIG. 2A). As the optical pump field 200 propagates in the secondary-optical-ring resonator 150, a portion of the optical pump field 200 is coupled to the primary-optical-ring resonator 50 via the optical coupler 422 (FIG. 2B).

The optical pump field 200 and a second order SBS field 220 propagate in the primary-optical-ring resonator 50 in a first direction, which in this exemplary embodiment is counter-clockwise. The first order SBS field 210 propagates in the primary-optical-ring resonator 50 in a second direction, which in this exemplary embodiment is clockwise.

When the first order SBS field 210, which propagates in the second direction through the primary-optical-ring resonator 50, passes the optical coupling region 422-B of optical coupler 422 (FIG. 2B), a portion is coupled into the secondary-optical-ring resonator 150. A portion of that first order SBS field 210 is coupled out of the secondary-optical-ring resonator 150 when it propagates through the optical coupling region 421-B of the optical coupler 421 (FIG. 2A). The first order SBS field 210 that is output from the secondary-optical-ring resonator 150 is guided through waveguide 149 and the circulator 620 to the beat detector 131.

When the optical pump field 200 and the second order SBS field 220, which propagate in the first direction through the primary-optical-ring resonator 50, pass the optical coupling region 422-B of optical coupler 422 (FIG. 2B), a portion of each field is coupled into the secondary-optical-ring resonator 150. A portion of that optical pump field 200 and the second order SBS field 220 is coupled out of the secondary-optical-ring resonator 150 into the waveguide 149 when those fields propagate through the optical coupling region 421-B of the optical coupler 421 (FIG. 2A).

A portion of each of the optical pump field 200 and the second order SBS field 220 is guided via a splitter 616 in the waveguide 149 to the optical clock detector 121 that generates a reference/clock signal. In this manner, optical clock detector 121 generates a reference frequency signal based on the co-propagating optical pump field 200 and a second order SBS field 220.

The remainder of the optical pump field 200 and a second order SBS field 220 is directed by the splitter 616 to couple into the pump rejection filter 160 at the directional coupler 631. The pump rejection filter 160 in this embodiment is an optical ring resonator 160 that resonates at the frequency of the second order SBS field 220. The optical ring resonator 160 filters the optical pump field 200 from the second order SBS field 220. The pump field 200 does not resonate in the pump rejection filter 160 and the second order SBS field 220 does resonate in the pump rejection filter 160. The pump field 200 is dumped from the RLG 12 by one of several possible techniques as is understandable to one skilled in the art. For example, the pump field 200 is dumped from the pump rejection filter 160 to an absorber 130.

A portion of the resonating second order SBS field 220 is coupled out of the pump rejection filter 160 via optical coupler 632 to the waveguide in which the first order SBS field 210 is propagating. In this manner, the second order SBS field co-propagates with the first order SBS field and the co-propagating fields are incident on the beat detector 131.

In the embodiment shown in FIG. 4, the pump rejection filter 160 is thermally controlled by temperature servo 149 and resistive elements to ensure resonance at the second order SBS field 220 is maintained. The gyro electronics process the signals from the beat detector 131 and the reference/clock signal from the optical clock detector 121 to measure the rate of rotation of the RLG 12.

The readout-out mechanism of RLG 12 is similar to that of a conventional RLG, the best and most expensive of which are also quantum noise limited. However, because the RLG 12 has an ~10 GHz frequency splitting even at zero rotation rate, there is no risk of backscatter from one mode into the counter-propagating mode seeding the laser pump 100 and causing the "lock-in" effect that occurs in conventional RLGs, where the counter propagating resonance frequencies become degenerate at small rates. In conventional RLGs, a "dither motor" is required to prevent resonance frequencies from becoming degenerate at small rates; the dither motor rotates the gyro to ensure that it always measures a rate above the lock-in threshold.

Advantageously, the RLG 12 does not have lock-in and therefore does not require a dither motor or any moving part. In addition, the high signal frequency (e.g., ~10 GHz) provides some advantage in high-dynamic environments. In a prior art gyroscope, the photodetectors and amplifiers are optimized for high sensitivity at low frequencies in order to detect small rotations, where a DC output corresponds to zero rotation rate. These prior art photodetectors and amplifiers might not have the bandwidth to accurately sense the ~20 MHz beat signal, which would be expected (given the form factor described previously) for a 100,000 deg/sec rotation rate. For photodetectors and amplifiers, which are optimized to sense 10 GHz, a 20 MHz frequency change does not stretch the bandwidth limits of the photodetectors and amplifiers.

However, the change in the frequency difference between the first and second order modes induced by the Sagnac effect by Earth's rotation rate is on the order of one Hertz for a resonator with an approximately 1 square inch enclosed area. To measure a fractional frequency shift this small, the clock signal must of high enough quality to indicate exactly when one second has passed to within one part in 11 billion, so a user knows how many light-dark cycles have been observed in that that time. The clock signal in this case is generated from the beat note of the co-propagating pump and second order SBS (or potentially in some embodiments from the first and third order SBS) with the frequency divided into half frequency (N×FSR~10 GHz) so that it can be compared to the beat note between counter-propagating SBS modes. A frequency change on the beat note between counter propagating modes, which is not due to rotation, will typically also appear on the beat notes between the co-propagating fields, and thus can be canceled out. A rotation, on the other hand, will generate a frequency shift on the beat note between the counter propagating fields, but not on the beat note between co-propagating fields.

In this case, the clock signal uses the ~20 GHz signal as a frequency reference since the optical pump field 200 and co-propagating second order SBS field 220 differs in frequency by $2v_{sbs}$=20 GHz. This frequency difference is independent of the rotation rate, since a rotation affects electro-magnetic fields propagating in the same direction in the same way, and cancels out when the difference frequency is measured.

The $2v_{sbs}$ GHz clock signal has an advantage over any external frequency references of any quality. The clock frequency may wander in absolute terms due to effects (such as temperature changes), which cause a change in the path length and thus the FSR of the resonator. However, any such effect on the FSR will also change the frequency of the ~10 GHz signal on which the rotation is encoded. Since that change is not rotation related, it represents an error. But if an exactly corresponding change occurs in the frequency reference, then the error cancels out of the actual rotation measurement as described previously.

In one implementation of this embodiment, the signal processing scheme to enable common mode error cancelation divides the (2N×FSR) signal frequency by two and then mixes it with the (N×FSR+$f_\Omega$) signal. The output of this mixer is low-pass filtered. For a perfect primary-optical-ring resonator 50, the mixer output is DC at zero rotation rate, and about a half a Hertz at Earth rate; the ~10 GHz "background" is removed, along with any changes in the FSR.

The output frequency of a laser depends not only on the "cold cavity" resonance frequency of the resonator, but also on the center frequency of the optical gain curves 311 and 312 (FIG. 3). If the free spectral range of the primary-optical-ring resonator 50 is not perfectly tuned to match the SBS frequency shift $v_{sbs}$, the different cavity resonances (i.e., 301 and 302 shown in FIG. 3) are separated from the nearest gain peak (i.e., 311, and 312 shown in FIG. 3) by different amounts. This creates mode pulling that is not fully canceled out by the mixing with the ~20 GHz described above. However, it is a repeatable phenomenon for a given primary-optical-ring resonator, and can be characterized as a function of temperature, and subtracted out. Mode pulling can potentially be used to electronically separate any signal coming from the beating of the first order SBS field 210 with the residual optical pump field 200 that is passed through the optical filter 160.

Figure 5:
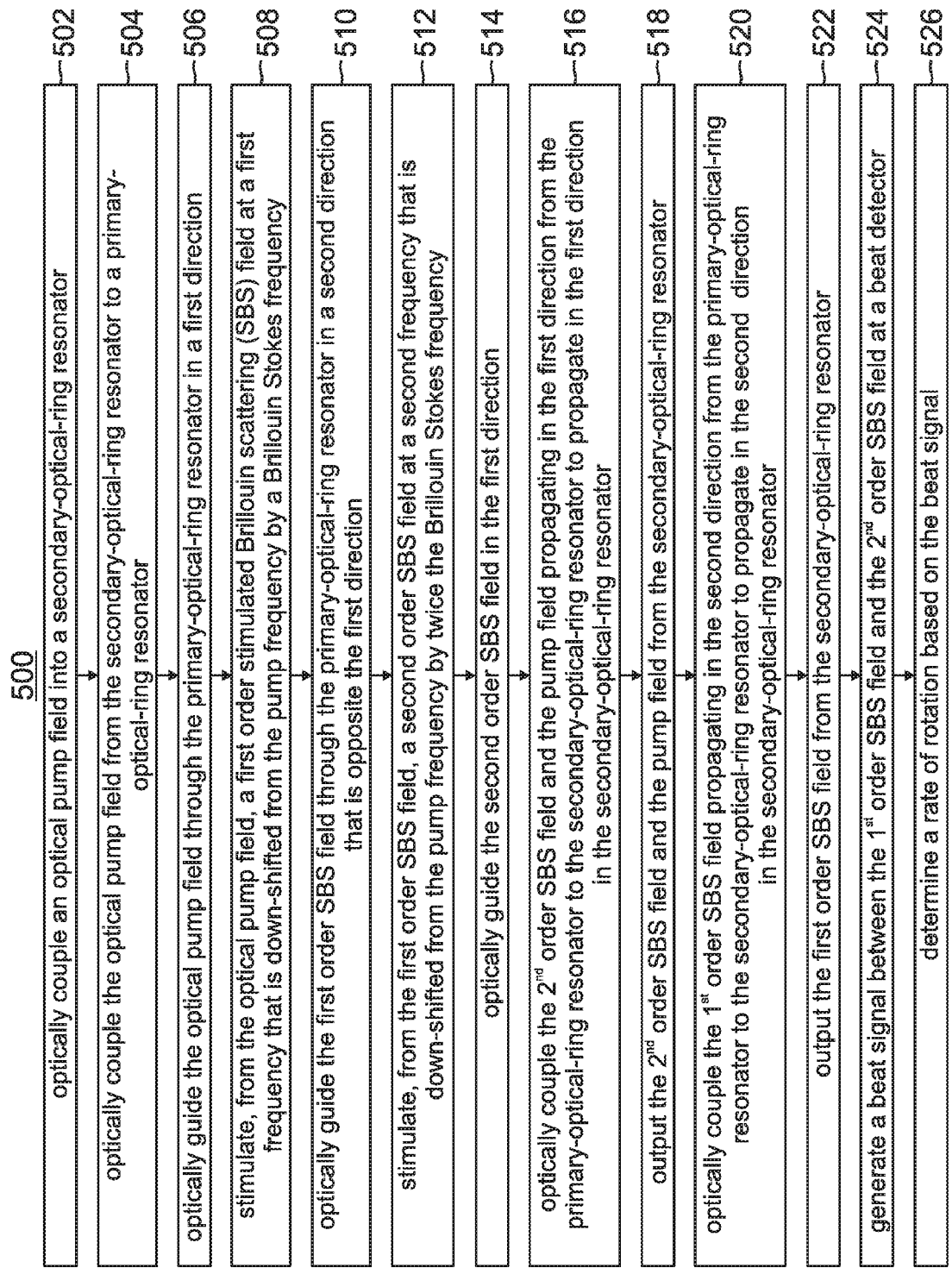
FIG. 5 shows a flow diagram of an embodiment of a method of measuring rotation in accordance with the present application.

FIG. 5 shows a method 500 of measuring rotation in accordance with the present application. The embodiment of method 500 is described as being implemented using the RLG 12 of FIG. 4 and the frequency distribution shown in FIG. 3. The process of method 500 is applicable to other embodiments of RLGs.

At block 502, an optical pump field 200 having a pump frequency $v_p$ is optically coupled into a secondary-optical-ring resonator 150 via the optical coupler 421. The optical pump field 200 is coupled from the waveguide 149 to the secondary-optical-ring resonator 150 as shown in FIG. 2A.

At block 504, the optical pump field 200 is optically coupled from the secondary-optical-ring resonator 150 to a primary-optical-ring resonator 50 via the optical coupler 422. The optical pump field 200 is guided from the secondary-optical-ring resonator 150 to the primary-optical-ring resonator 50 as shown in FIG. 2A.

At block 506, the optical pump field 200 is optically guided to propagate through the primary-optical-ring resonator 50 in a first direction.

At block 508, the optical pump field 200 stimulates a first order stimulated Brillouin scattering (SBS) field 210 at a first frequency $V_{SBS1}$ that is down-shifted from the pump frequency $v_p$ by a Brillouin Stokes frequency $v_{sbs}$. A first optical gain curve 311 is stimulated at a first Stokes wave frequency $V_{SBS1}$ downshifted by a Brillouin Stokes frequency $v_{sbs}$ from the pump frequency $v_p$ as the optical pump field 200 propagates through the primary-optical-ring resonator 50 in the first direction.

At block 510, the first order SBS field 210 is optically guided to propagate through the primary-optical-ring resonator 50 in a second direction that is opposite the first direction.

At block 512, the first order SBS field 210 stimulates a second order SBS field 220 at a second frequency that is down-shifted from the pump frequency $v_p$ by twice the Brillouin Stokes frequency $2v_{sbs}$. A second optical gain curve 312 is stimulated at the second Stokes wave frequency $V_{SBS2}$ downshifted by twice the Brillouin Stokes frequency $2v_{sbs}$ from the pump frequency $v_p$ by the first order SBS field 210 propagating through the primary-optical-ring resonator 50 in the second direction.

At block 514, the second order SBS field 220 is optically guided to propagate in the primary-optical-ring resonator 50 in the first direction. In this manner, the second order SBS field 220 co-propagates with the optical pump field 200.

At block 516, the second order SBS field 220 and the pump field 200 propagating in the first direction are optically coupled from the primary-optical-ring resonator 50 to the secondary-optical-ring resonator 150 via the optical coupling regions 422-A and 422-B in the optical coupler 422 (FIG. 2B) to propagate in the first direction in the secondary-optical-ring resonator 150. A portion of the optical pump field 200 propagating in the first direction in the secondary-optical-ring resonator 150 is coupled from the optical coupling region 421-B (FIG. 2A) in the secondary-optical-ring resonator 150 to the optical coupling region 421-A (FIG. 2A) in the waveguide 149 to propagate in the waveguide 149 as shown in FIG. 4. A portion of the second order SBS field 220 propagating in the secondary-optical-ring resonator 150 is coupled from the optical coupling region 421-B (FIG. 2A) in the secondary-optical-ring resonator 150 to the optical coupling region 421-A (FIG. 2A) in the waveguide 149 to propagate in the waveguide 149 as shown in FIG. 4.

At block 518, the second order SBS field 220 and the optical pump field 200 are output from the secondary-optical-ring resonator 150 via the optical coupler 421 of the secondary-optical-ring resonator 150. The fraction of the pump field 200 that couples out of the primary ring resonator 50, through the secondary resonator 150, and out of the secondary-optical-ring resonator is larger than the fraction of the fraction of a second order SBS field 220 that couples out of the primary ring resonator 50, through the secondary-optical-ring resonator 150, and out of the secondary-optical-ring resonator 150.

The optical pump field 200 and the second order SBS field 220 output from the secondary-optical-ring resonator 150 are guided via optical waveguide 149 to the pump rejection filter 160. The second order SBS field 220 is separated from the optical pump field 200 by pump rejection filter 160. In one implementation of this embodiment, the optical pump field 200 and the second order SBS field 220 output from the secondary-optical-ring resonator 150 are guided to a optical clock detector 121, which generates the reference frequency signal based on the co-propagating pump field 200 and second order SBS field 220.

At block 520, the first order SBS field 210 propagating in the second direction in the primary-optical-ring resonator is optically coupled to the secondary-optical-ring resonator via optical coupler 422 to propagate in the second direction in the secondary-optical-ring resonator 150. A portion of the first order SBS field 210 propagating in the second direction in the primary-optical-ring resonator 50 is coupled from the optical coupling region 422-B (FIG. 2B) in the primary-optical-ring resonator 50 to the optical coupling region 422-A (FIG. 2B) in the secondary-optical-ring resonator 150 to propagate in the secondary-optical-ring resonator 150 as shown in FIG. 4.

At block 522, the first order SBS field 210 is output from the secondary-optical-ring resonator 150 via the optical coupler 421. A portion of the first order SBS field 210 propagating in the secondary-optical-ring resonator 150 is coupled from the optical coupling region 421-B (FIG. 2A) in the secondary-optical-ring resonator 150 to the optical coupling region 421-A (FIG. 2A) in the waveguide 149 to propagate in the waveguide 149 as shown in FIG. 4. The fraction of the pump field 200 that couples out of the primary ring resonator 50, through the secondary resonator 150, and out of the secondary-optical-ring resonator 150 is larger than the fraction of the first order SBS 210 field that couples out of the primary ring resonator 50, through the secondary-optical-ring resonator 150, and out of the secondary-optical-ring resonator 150.

At block 524, a beat signal is generated between the first order SBS field 210 and the second order SBS field 220 at a beat detector 131. The second order SBS field 220 is coupled out of the from the pump rejection filter 160 via the optical coupler 632 to co-propagate with the first order SBS field 210 propagating in the waveguide 149. The first order SBS field 210 and the second order SBS field 220 are combined while propagating in the waveguide 149 and the combined signals are incident on a beat detector 131. The first order SBS field 210 and the second order SBS field 220 beat with each other at the beat frequency equal to the Brillouin Stokes frequency $v_{sbs}$.

At block 526, a rate of rotation of the primary-optical-ring resonator 50 is determined based on the beat signal between the first order SBS field 210 and the second order SBS field 220.

Figure 6:
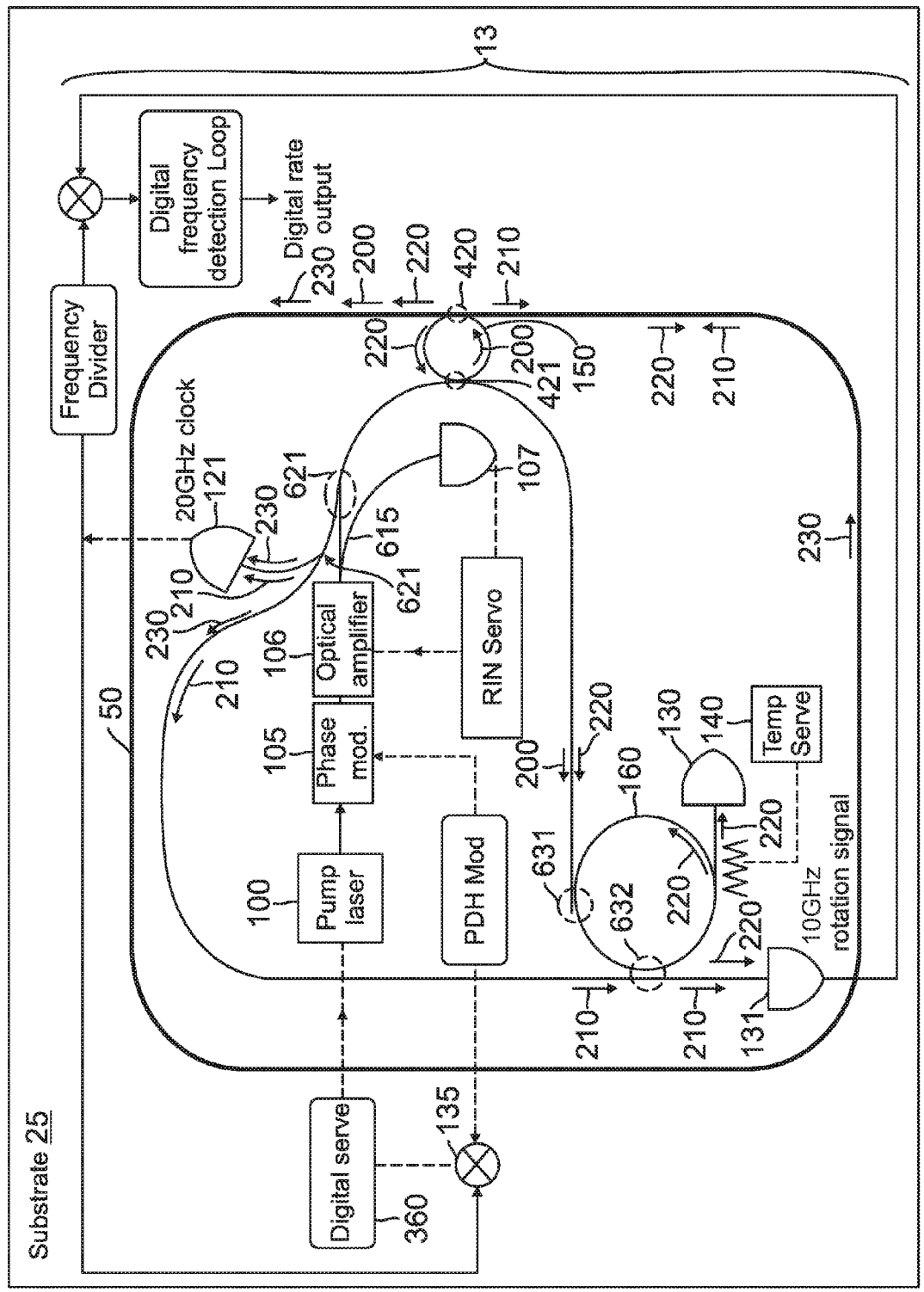
FIG. 6 shows an embodiment of a ring laser gyroscope on a substrate in accordance with the present application.

FIG. 6 shows an embodiment of a RLG 13 in accordance with the present application. The RLG 13 differs from the RLG 12, described above with reference to FIG. 4, in that the beat note between $1^{st}$ order SBS 210 and $3^{rd}$ order SBS 230 is used to generate the reference frequency/clock signal at the optical clock detector 121, unlike the embodiment of FIG. 4 in which the pump 210 and second order SBS generate the reference frequency/clock signal at the optical clock detector 121. The third order SBS 230 at a third stokes wave frequency co-propagates in the second direction with the first order SBS 210 at the first stokes wave frequency. The third stokes wave frequency is downshifted by twice the Brillouin Stokes frequency from the first stokes wave frequency.

The third order SBS field 230 is output from the primary-optical-ring resonator 50 with the first order SBS field 210 and guided along with the first order SBS field 210 to the optical clock detector 121, which generates the reference frequency signal based on the co-propagating first order SBS field 210 and the third order SBS field 230. In this embodiment, the fraction of the pump field 200 that couples out of the primary ring resonator 50, through the secondary resonator 150, and out of the secondary-optical-ring resonator is larger than the fraction of the third order SBS field 230 that couples out of the primary ring resonator 50, through the secondary-optical-ring resonator 150, and out of the secondary-optical-ring resonator 150.

As second order SBS field 220 propagates in the first direction through the primary-optical-ring resonator 50, a third Brillouin scattering gain curve is stimulated by the second order SBS field 220 at a third Stokes wave frequency $V_{SBS3}$ that is downshifted by the Brillouin Stokes frequency $v_{sbs}$ from the second SBS field at $v_{SBS2}$. The primary-optical-ring resonator 50 has a resonator mode within the bandwidth of the third optical gain curve. With sufficiently low resonator loss, the optical gain in the second optical gain curve 312 gives rise to a lasing electro-magnetic field counter propagating to the second order SBS field 220. Third order stimulated Brillouin scattering provides the optical gain, and amplifies electro-magnetic fields, which counter-propagate with the second order SBS field 220 and co-propagate with the first order SBS field 210.

In this manner, when the intensity of the second order SBS field 220 exceeds the stimulated Brillouin threshold, the second order SBS field 220 has sufficient optical power to stimulate the third order SBS field 230 at frequency $v_{SBS3}$. The frequency $V_{SBS3}$ of third order SBS field 230 is roughly N×FSR away from the frequency $V_{SBS2}$ of the second order SBS field 220, and about 2N×FSR away from the frequency $V_{SBS2}$ of the second order SBS field 220. The intensity of the third order SBS field 230 increases as the intensity of the second order SBS field 220 increases.

In this embodiment, the first order SBS field 210 and the third order SBS 230, which propagate in the second direction through the primary-optical-ring resonator 50, pass the optical coupler 422 to propagate in the secondary-optical-ring resonator 150 and pass the optical coupler 421 to propagate in the waveguide 149 toward the splitter 621. A portion of each field is guided via splitter 621 to the optical clock detector 121 to generate the reference frequency/clock signal. In this manner, optical clock detector 121 generates a reference frequency signal based on the co-propagating first order SBS field 210 and the third order SBS 230. The remainder of the first order SBS field 210 and the third order SBS 230 is guided to the beat detector 131 via the splitter 621.

As shown in FIG. 6, the optical pump field 200 and a second order SBS field 220, which propagate in the first direction through the primary-optical-ring resonator 50, pass the optical coupler 422 to propagate in the secondary-optical-ring resonator 150 and pass the optical coupler 421 to propagate in the waveguide 149 toward the pump rejection filter 160. The gyro electronics process the signals from the beat detector 131 and the reference/clock signal from the optical clock detector 121 as described above with reference to FIG. 4.

Figure 7:
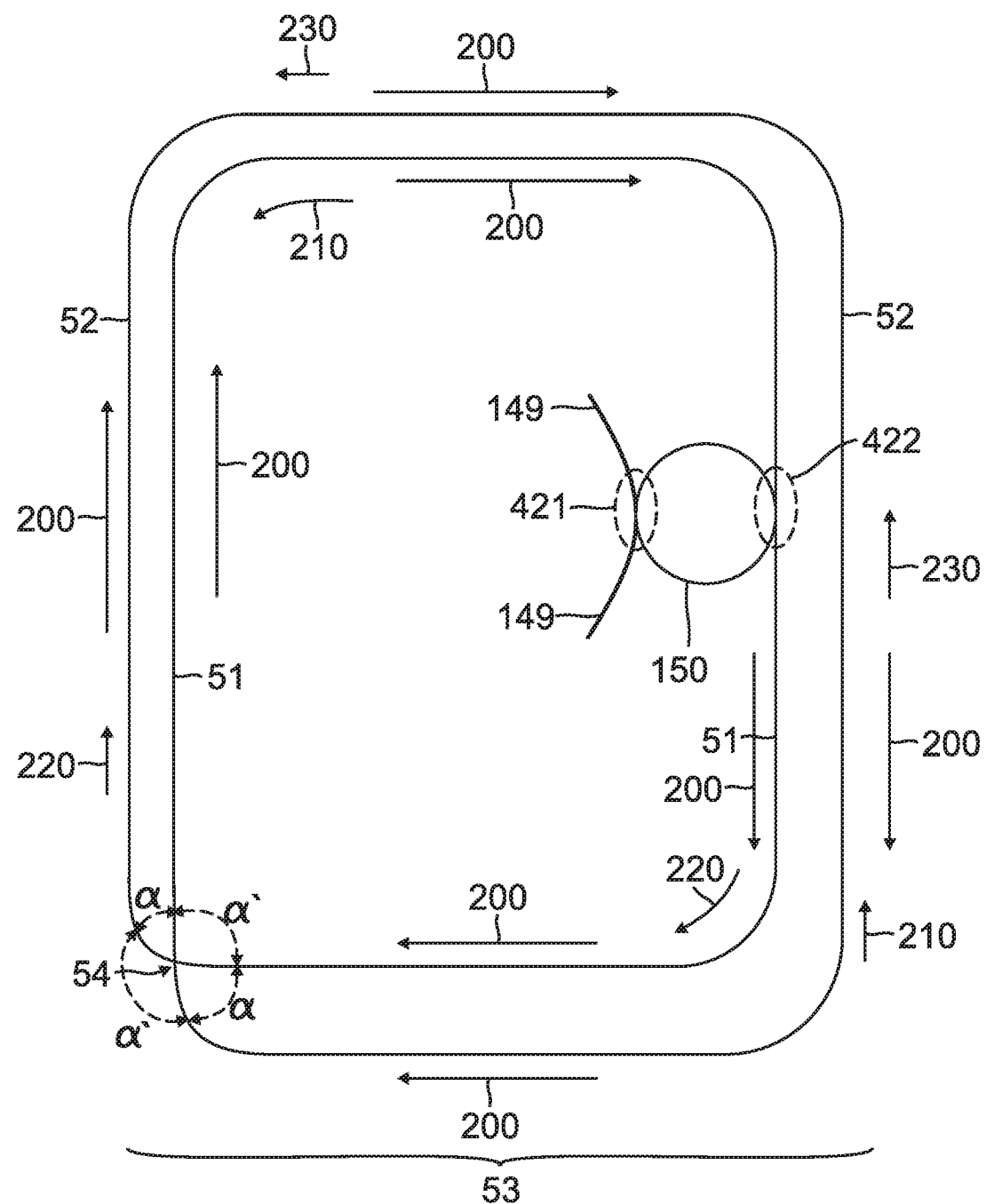
FIG. 7 shows an embodiment of a primary-optical-ring resonator configured as an N-turn waveguide loop in accordance with the present application.

FIG. 7 shows an embodiment of an primary-optical-ring resonator 51 configured as an N-turn waveguide loop 51 in accordance with the present application. An optical ring resonator that is configured as an N-turn waveguide loop has N loops, where N is a positive integer greater than 1. The inner-most loop is connected to the outer-most loop a section of waveguide that has N−1 crossovers, which may be in a single plane or stacked out of plane. In the exemplary embodiment shown in FIG. 7, the multiple-turn waveguide loop is a two-turn waveguide loop 51 with one layer crossover 54. The two-turn waveguide loop has an inner loop 51 and an outer loop 52. The optical coupler 422 is on the inner loop 51 for an embodiment in which the laser 100 and the secondary-optical-ring resonator 150 are encircled by the optical ring resonator 51. In another implementation of this embodiment, the optical coupler 422 is on the outer loop 52 for an embodiment in which the laser 100 and the secondary-optical-ring resonator 150 are not encircled by the optical ring resonator 51.

Any of the embodiments of ring laser gyroscopes described herein can be implemented with the secondary-optical-ring resonator 51 in place of the primary-optical-ring resonator 50. A "single layer crossover" is defined herein as a crossing of two optical waveguides which are formed from the same layer or the same plurality of layers. The single layer crossover is shown to be at angles $\alpha$ and $\alpha'$, where $\alpha+\alpha'=180°$. In one implementation of this embodiment, $\alpha$ is 120° and $\alpha'$ is 60°. In another implementation of this embodiment, $\alpha$ and $\alpha'$ are both 90°.

As is understandable to one skilled in the art, the primary-optical-ring resonator 51 in the ring laser gyroscopes described herein can also be three-turn waveguide loop with two crossovers 54, a four-turn waveguide loop with three crossovers 54, etc. The limit on the number of turns in the waveguides of the primary-optical-ring resonator 51 is constrained by the loss in each crossover 54 and the required gain in the optical waveguide. As the loss in crossover 54 improves more turns can be implemented.

In this manner a compact, robust ring laser gyroscope is formed on a substrate and is able to measure the rotation rate without fragile moving parts. Advantageously, the ring laser gyroscopes described herein only require a single pump laser and fully benefit from the low relative phase noise between pump and SBS. Additionally, the pump power is used more efficiently due to the secondary-optical-ring resonator. The ring laser gyroscopes described herein can be monolithically integrated and are appropriate for thermally extreme environments while being tolerant of high shock, and high vibration applications.

EXAMPLE EMBODIMENTS

Example 1 includes a ring laser gyroscope comprising: a primary-optical-ring resonator configured to guide optical fields in a first direction and a second direction, the second direction being opposite the first direction, the primary-optical-ring resonator including at least one optical coupling region to couple optical fields into and out of the primary-optical-ring resonator; an optical source to provide a pump field at a pump frequency that is on resonance with the primary-optical-ring resonator; and a secondary-optical-ring resonator including at least two optical coupling regions, one of which couples optical fields into and out of the primary-optical-ring resonator, and one of which couples the pump field into and out of the secondary-optical-ring resonator, wherein the pump field couples into the primary-optical-ring resonator from the secondary-optical-ring resonator, wherein the pump field in the primary-optical-ring resonator stimulates a first optical gain curve at a first stokes wave frequency downshifted by a Brillouin stokes frequency from the pump frequency, wherein the primary-optical-ring resonator has a resonator mode within a bandwidth of the first optical gain curve, wherein the SBS gain gives rise to a frequency-shifted field propagating in the second direction, wherein a first order SBS field stimulates a second optical gain curve at a second stokes wave frequency downshifted by twice the Brillouin Stokes frequency from the pump frequency, wherein the primary-optical-ring resonator has a resonator mode within the bandwidth of the second optical gain curve, wherein the second order SBS gain gives rise to a frequency-shifted field propagating in the first direction, wherein the fraction of the pump field that couples out of the primary-optical-ring resonator, through the secondary-optical-ring resonator, and out of the secondary-optical-ring resonator is larger than: 1) the fraction of the first order SBS field that couples out of the primary-optical-ring resonator, through the secondary-optical-ring resonator, and out of the secondary-optical-ring resonator; and 2) the fraction of a second order SBS field that couples out of the primary-optical-ring resonator, through the secondary-optical-ring resonator, and out of the secondary-optical-ring resonator.

Example 2 includes the ring laser gyroscope of Example 1, further comprising: a beat detector configured to produce an optical beat signal that varies as a function of a frequency difference between the first order SBS field and the second order SBS field; and an optical clock detector to generate a reference frequency signal based on two co-propagating fields.

Example 3 includes the ring laser gyroscope of Example 2, wherein the optical clock detector is configured to generate the reference frequency signal based on a beat signal between the pump frequency and the second stokes wave frequency, which is downshifted by twice the Brillouin Stokes frequency from the pump frequency.

Example 4 includes the ring laser gyroscope of any of Examples 2-3, wherein the optical clock detector is configured to generate the reference frequency signal based on a beat signal between the first order SBS frequency and a third stokes wave frequency of a third order stimulated Brillouin scattering (SBS) field, the third stokes wave frequency being downshifted by twice the Brillouin Stokes frequency from the first stokes wave frequency.

Example 5 includes the ring laser gyroscope of any of Examples 1-4, wherein the primary-optical-ring resonator and the secondary-optical-ring resonator are rigid optical waveguide resonators.

Example 6 includes the ring laser gyroscope of any of Examples 1-5, wherein the primary-optical-ring resonator is an N-turn waveguide loop with N–1 crossovers, where N is a positive integer greater than any of Examples 1-5.

Example 7 includes the ring laser gyroscope of any of Examples 1-6, further comprising: a pump rejection filter configured to reject the pump field after the co-propagating pump field and the second order SBS field are output from the secondary-optical-ring resonator.

Example 8 includes the ring laser gyroscope of Example 7, further comprising a beat detector configured to produce an optical beat signal that varies as a function of a frequency difference between the first order SBS field and the second order SBS field; and an optical clock detector to generate a reference frequency signal based on two co-propagating fields, wherein the pump rejection filter is a filtering-ring resonator, the filtering-ring resonator further configured to couple the second order SBS field to co-propagate with the first order SBS field to be incident on the beat detector.

Example 9 includes the ring laser gyroscope of any of Examples 1-8, further comprising: a substrate on which the primary-optical-ring resonator is formed, on which the secondary-optical-ring resonator is formed, and on which the optical source to provide the pump field is positioned.

Example 10 includes the ring laser gyroscope of any of Examples 1-9, further comprising: a substrate on which the primary-optical-ring resonator is formed, on which the secondary-optical-ring resonator is formed, and on which the optical source to provide the pump field is positioned; and electronics positioned on the substrate and configured to process optical fields output from the secondary-optical-ring resonator to measure rotation.

Example 11 includes a ring laser gyroscope comprising: a primary-optical-ring resonator formed on a substrate and configured to guide optical fields in a first direction and a second direction, the second direction being opposite the first direction, the primary-optical-ring resonator including at least one optical coupling region to couple optical fields into and out of the primary-optical-ring resonator; an optical source positioned on the substrate to provide a pump field at a pump frequency that is on resonance with the primary-optical-ring resonator; and a secondary-optical-ring resonator formed on the substrate, the secondary-optical-ring resonator including at least two optical coupling regions, one of which couples optical fields into and out of the primary-optical-ring resonator, and one of which couples the pump field into and out of the secondary-optical-ring resonator, wherein the pump field couples into the primary-optical-ring resonator from the secondary-optical-ring resonator, wherein the pump field in the primary-optical-ring resonator stimulates a first optical gain curve at a first stokes wave frequency downshifted by a Brillouin stokes frequency from the pump frequency, wherein the primary-optical-ring resonator has a resonator mode within a bandwidth of the first optical gain curve, wherein the SBS gain gives rise to a frequency-shifted field propagating in the second direction, wherein a first order SBS field stimulates a second optical gain curve at a second stokes wave frequency downshifted by twice the Brillouin Stokes frequency from the pump frequency, wherein the primary-optical-ring resonator has a resonator mode within the bandwidth of the second optical gain curve, wherein the second order SBS gain gives rise to a frequency-shifted field propagating in the first direction, wherein the fraction of the pump field that couples out of the primary-optical-ring resonator, through the secondary-optical-ring resonator, and out of the secondary-optical-ring resonator is larger than: 1) the fraction of the first order SBS field that couples out of the primary-optical-ring resonator, through the secondary-optical-ring resonator, and out of the secondary-optical-ring resonator; and 2) the fraction of a second order SBS field that couples out of the primary-optical-ring resonator, through the secondary-optical-ring resonator, and out of the secondary-optical-ring resonator.

Example 12 includes the ring laser gyroscope of Example 11, further comprising: a beat detector positioned on the substrate and configured to produce an optical beat signal that varies as a function of a frequency difference between the first order SBS field and the second order SBS field; an optical clock detector positioned on the substrate, the optical clock configured to generate a reference frequency signal based on two co-propagating fields; and a pump rejection filter to reject the pump field from the second order SBS field after the pump field and the second order SBS field propagating in the first direction are output from the primary-optical-ring resonator and from the secondary-optical-ring resonator.

Example 13 includes the ring laser gyroscope of Example 12, wherein the optical clock detector is configured to generate the reference frequency signal based on a beat signal between the pump frequency and the second stokes wave frequency, which is downshifted by twice the Brillouin Stokes frequency from the pump frequency.

Example 14 includes the ring laser gyroscope of any of Examples 12-13, wherein the optical clock detector is configured to generate the reference frequency signal based on a beat signal between the first order SBS frequency and a third stokes wave frequency of a third order stimulated Brillouin scattering (SBS) field, the third stokes wave frequency being downshifted by twice the Brillouin Stokes frequency from the first stokes wave frequency.

Example 15 includes the ring laser gyroscope of any of Examples 12-14, wherein the pump rejection filter is a filtering-ring resonator, which is formed in the substrate and is further configured to couple the second order SBS field to co-propagate with the first order SBS field to be incident on the beat detector.

Example 16 includes the ring laser gyroscope of any of Examples 11-15, wherein the primary-optical-ring resonator is an N-turn waveguide loop with N−1 crossovers, where N is a positive integer greater than any of Examples 1-15.

Example 17 includes a method for measuring rotation, the method comprising: optically coupling an optical pump field into a secondary-optical-ring resonator; optically coupling the optical pump field from the secondary-optical-ring resonator to a primary-optical-ring resonator; optically guiding the optical pump field through the primary-optical-ring resonator in a first direction; stimulating, from the optical pump field, a first order stimulated Brillouin scattering (SBS) field at a first frequency that is down-shifted from the pump frequency by a Brillouin Stokes frequency; optically guiding the first order SBS field through the primary-optical-ring resonator in a second direction that is opposite the first direction, stimulating, from the first order SBS field, a second order SBS field at a second frequency that is down-shifted from the pump frequency by twice the Brillouin Stokes frequency; and optically guiding the second order SBS field in the first direction; optically coupling the second order SBS field and the pump field propagating in the first direction from the primary-optical-ring resonator to the secondary-optical-ring resonator to propagate in the first direction in the secondary-optical-ring resonator; outputting the second order SBS field and the pump field from the secondary-optical-ring resonator; optically coupling the first order SBS field propagating in the second direction from the primary-optical-ring resonator to the secondary-optical-ring resonator to propagate in the second direction in the secondary-optical-ring resonator outputting the first order SBS field from the secondary-optical-ring resonator; generating a beat signal between the first order SBS field and the second order SBS field at a beat detector; and determining a rate of rotation based on the beat signal.

Example 18 includes the method of Example 17, further comprising: generating a reference frequency signal based on two co-propagating fields being incident on an optical clock detector.

Example 19 includes the method of claim 17, further comprising: generating a reference frequency signal based on a beat signal between the first order SBS field and a third order SBS field at a third frequency, the third frequency being downshifted by twice the Brillouin Stokes frequency from the first frequency, wherein the first order SBS field and the third order SBS field are co-propagating fields that are incident on an optical clock detector.

Example 20 includes the method of any of Examples 17-19, further comprising: separating the second order SBS field from the pump field by a pump rejection filter; coupling the second order SBS field from the pump rejection filter to co-propagate with the first order SBS field; and guiding the co-propagating the first order SBS field and the second order SBS field to be incident on the beat detector.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

What is claimed is:

1. A ring laser gyroscope comprising:
   a primary-optical-ring resonator configured to guide optical fields in a first direction and a second direction, the second direction being opposite the first direction, the primary-optical-ring resonator including at least one optical coupling region to couple optical fields into and out of the primary-optical-ring resonator;
   an optical source to provide a pump field at a pump frequency that is on resonance with the primary-optical-ring resonator; and
   a secondary-optical-ring resonator including at least two optical coupling regions, one of which couples optical fields into and out of the primary-optical-ring resonator, and one of which couples the pump field into and out of the secondary-optical-ring resonator,
   wherein the pump field couples into the primary-optical-ring resonator from the secondary-optical-ring resonator,
   wherein the pump field in the primary-optical-ring resonator stimulates a first optical gain curve at a first stokes wave frequency downshifted by a Brillouin stokes frequency from the pump frequency,
   wherein the primary-optical-ring resonator has a resonator mode within a bandwidth of the first optical gain curve,
   wherein the SBS gain gives rise to a frequency-shifted field propagating in the second direction,
   wherein a first order SBS field stimulates a second optical gain curve at a second stokes wave frequency downshifted by twice the Brillouin Stokes frequency from the pump frequency,
   wherein the primary-optical-ring resonator has a resonator mode within the bandwidth of the second optical gain curve,
   wherein the second order SBS gain gives rise to a frequency-shifted field propagating in the first direction,
   wherein the fraction of the pump field that couples out of the primary-optical-ring resonator, through the secondary-optical-ring resonator, and out of the secondary-optical-ring resonator is larger than:
   1) the fraction of the first order SBS field that couples out of the primary-optical-ring resonator, through the secondary-optical-ring resonator, and out of the secondary-optical-ring resonator; and
   2) the fraction of a second order SBS field that couples out of the primary-optical-ring resonator, through the secondary-optical-ring resonator, and out of the secondary-optical-ring resonator.

2. The ring laser gyroscope of claim 1, further comprising:
   a beat detector configured to produce an optical beat signal that varies as a function of a frequency difference between the first order SBS field and the second order SBS field; and
   an optical clock detector to generate a reference frequency signal based on two co-propagating fields.

3. The ring laser gyroscope of claim 2, wherein the optical clock detector is configured to generate the reference frequency signal based on a beat signal between the pump frequency and the second stokes wave frequency, which is downshifted by twice the Brillouin Stokes frequency from the pump frequency.

4. The ring laser gyroscope of claim 2, wherein the optical clock detector is configured to generate the reference frequency signal based on a beat signal between the first order SBS frequency and a third stokes wave frequency of a third order stimulated Brillouin scattering (SBS) field, the third stokes wave frequency being downshifted by twice the Brillouin Stokes frequency from the first stokes wave frequency.

5. The ring laser gyroscope of claim 1, wherein the primary-optical-ring resonator and the secondary-optical-ring resonator are rigid optical waveguide resonators.

6. The ring laser gyroscope of claim 1, wherein the primary-optical-ring resonator is an N-turn waveguide loop with N−1 crossovers, where N is a positive integer greater than 1.

7. The ring laser gyroscope of claim 1, further comprising:
   a pump rejection filter configured to reject the pump field after the co-propagating pump field and the second order SBS field are output from the secondary-optical-ring resonator.

8. The ring laser gyroscope of claim 7, further comprising
   a beat detector configured to produce an optical beat signal that varies as a function of a frequency difference between the first order SBS field and the second order SBS field; and
   an optical clock detector to generate a reference frequency signal based on two co-propagating fields,
   wherein the pump rejection filter is a filtering-ring resonator, the filtering-ring resonator further configured to couple the second order SBS field to co-propagate with the first order SBS field to be incident on the beat detector.

9. The ring laser gyroscope of claim 1, further comprising:
   a substrate on which the primary-optical-ring resonator is formed, on which the secondary-optical-ring resonator is formed, and on which the optical source to provide the pump field is positioned.

10. The ring laser gyroscope of claim 1, further comprising:
    a substrate on which the primary-optical-ring resonator is formed, on which the secondary-optical-ring resonator is formed, and on which the optical source to provide the pump field is positioned; and
    electronics positioned on the substrate and configured to process optical fields output from the secondary-optical-ring resonator to measure rotation.

11. A ring laser gyroscope comprising:
    a primary-optical-ring resonator formed on a substrate and configured to guide optical fields in a first direction and a second direction, the second direction being opposite the first direction, the primary-optical-ring resonator including at least one optical coupling region to couple optical fields into and out of the primary-optical-ring resonator;
    an optical source positioned on the substrate to provide a pump field at a pump frequency that is on resonance with the primary-optical-ring resonator; and
    a secondary-optical-ring resonator formed on the substrate, the secondary-optical-ring resonator including at least two optical coupling regions, one of which couples optical fields into and out of the primaryoptical-ring resonator, and one of which couples the pump field into and out of the secondary-optical-ring resonator, wherein the pump field couples into the primary-optical-ring resonator from the secondary-optical-ring resonator, wherein the pump field in the primary-optical-ring resonator stimulates a first optical gain curve at a first stokes wave frequency downshifted by a Brillouin stokes frequency from the pump frequency, wherein the primary-optical-ring resonator has a resonator mode within a bandwidth of the first optical gain curve, wherein the SBS gain gives rise to a frequency-shifted field propagating in the second direction, wherein a first order SBS field stimulates a second optical gain curve at a second stokes wave frequency downshifted by twice the Brillouin Stokes frequency from the pump frequency, wherein the primary-optical-ring resonator has a resonator mode within the bandwidth of the second optical gain curve, wherein the second order SBS gain gives rise to a frequency-shifted field propagating in the first direction, wherein the fraction of the pump field that couples out of the primary-optical-ring resonator, through the secondary-optical-ring resonator, and out of the secondary-optical-ring resonator is larger than:
1) the fraction of the first order SBS field that couples out of the primary-optical-ring resonator, through the secondary-optical-ring resonator, and out of the secondary-optical-ring resonator; and
2) the fraction of a second order SBS field that couples out of the primary-optical-ring resonator, through the secondary-optical-ring resonator, and out of the secondary-optical-ring resonator.

12. The ring laser gyroscope of claim 11, further comprising:
a beat detector positioned on the substrate and configured to produce an optical beat signal that varies as a function of a frequency difference between the first order SBS field and the second order SBS field;
an optical clock detector positioned on the substrate, the optical clock configured to generate a reference frequency signal based on two co-propagating fields; and
a pump rejection filter to reject the pump field from the second order SBS field after the pump field and the second order SBS field propagating in the first direction are output from the primary-optical-ring resonator and from the secondary-optical-ring resonator.

13. The ring laser gyroscope of claim 12, wherein the optical clock detector is configured to generate the reference frequency signal based on a beat signal between the pump frequency and the second stokes wave frequency, which is downshifted by twice the Brillouin Stokes frequency from the pump frequency.

14. The ring laser gyroscope of claim 12, wherein the optical clock detector is configured to generate the reference frequency signal based on a beat signal between the first order SBS frequency and a third stokes wave frequency of a third order stimulated Brillouin scattering (SBS) field, the third stokes wave frequency being downshifted by twice the Brillouin Stokes frequency from the first stokes wave frequency.

15. The ring laser gyroscope of claim 12, wherein the pump rejection filter is a filtering-ring resonator, which is formed in the substrate and is further configured to couple the second order SBS field to co-propagate with the first order SBS field to be incident on the beat detector.

16. The ring laser gyroscope of claim 11, wherein the primary-optical-ring resonator is an N-turn waveguide loop with N−1 crossovers, where N is a positive integer greater than 1.

17. A method for measuring rotation, the method comprising:
optically coupling an optical pump field into a secondary-optical-ring resonator;
optically coupling the optical pump field from the secondary-optical-ring resonator to a primary-optical-ring resonator;
optically guiding the optical pump field through the primary-optical-ring resonator in a first direction;
stimulating, from the optical pump field, a first order stimulated Brillouin scattering (SBS) field at a first frequency that is down-shifted from the pump frequency by a Brillouin Stokes frequency;
optically guiding the first order SBS field through the primary-optical-ring resonator in a second direction that is opposite the first direction,
stimulating, from the first order SBS field, a second order SBS field at a second frequency that is down-shifted from the pump frequency by twice the Brillouin Stokes frequency; and
optically guiding the second order SBS field in the first direction;
optically coupling the second order SBS field and the pump field propagating in the first direction from the primary-optical-ring resonator to the secondary-optical-ring resonator to propagate in the first direction in the secondary-optical-ring resonator;
outputting the second order SBS field and the pump field from the secondary-optical-ring resonator;
optically coupling the first order SBS field propagating in the second direction from the primary-optical-ring resonator to the secondary-optical-ring resonator to propagate in the second direction in the secondary-optical-ring resonator
outputting the first order SBS field from the secondary-optical-ring resonator;
generating a beat signal between the first order SBS field and the second order SBS field at a beat detector; and
determining a rate of rotation based on the beat signal.

18. The method of claim 17, further comprising:
generating a reference frequency signal based on two co-propagating fields being incident on an optical clock detector.

19. The method of claim 17, further comprising:
generating a reference frequency signal based on a beat signal between the first order SBS field and a third order SBS field at a third frequency, the third frequency being downshifted by twice the Brillouin Stokes frequency from the first frequency, wherein the first order SBS field and the third order SBS field are co-propagating fields that are incident on an optical clock detector.

20. The method of claim 17, further comprising:
separating the second order SBS field from the pump field by a pump rejection filter;
coupling the second order SBS field from the pump rejection filter to co-propagate with the first order SBS field; and guiding the co-propagating the first order SBS field and the second order SBS field to be incident on the beat detector.

\* \* \* \* \*